(12) United States Patent
Yu et al.

(10) Patent No.: US 10,852,398 B2
(45) Date of Patent: Dec. 1, 2020

(54) VEHICLE-MOUNTED LIGHT DETECTION AND RANGING (LIDAR) SYSTEM

(71) Applicant: O-NET Communications (ShenZhen) limited, Shenzhen (CN)

(72) Inventors: Aihua Yu, Shenzhen (CN); Yimin Hua, Shenzhen (CN)

(73) Assignee: O-NET COMMUNICATIONS (SHENZHEN) LIMITED, Shenzhen (CN)

(*) Notice: Subject to any disclaimer, the term of this patent is extended or adjusted under 35 U.S.C. 154(b) by 0 days.

(21) Appl. No.: 16/686,197

(22) Filed: Nov. 17, 2019

(65) Prior Publication Data
US 2020/0341124 A1 Oct. 29, 2020

Related U.S. Application Data

(63) Continuation of application No. PCT/CN2017/084743, filed on May 17, 2017.

(51) Int. Cl.
*G01S 7/481* (2006.01)
*H01S 3/094* (2006.01)
(Continued)

(52) U.S. Cl.
CPC .......... *G01S 7/4818* (2013.01); *G01S 7/4817* (2013.01); *G01S 17/931* (2020.01);
(Continued)

(58) Field of Classification Search
CPC .. B60W 2420/52; G01S 17/931; G01S 17/89; G01S 13/865; G01S 2013/9323;
(Continued)

(56) References Cited

U.S. PATENT DOCUMENTS 8,488,233 B2 * 7/2013 Huang ................ H01S 3/06754
359/337.21
10,135,218 B2 * 11/2018 Popovic ................ H04B 10/40
(Continued)

FOREIGN PATENT DOCUMENTS

| CN | 103138842 A | 6/2013 |
|---|---|---|
| CN | 103299208 A | 9/2013 |

OTHER PUBLICATIONS

International Search Report for PCT/CN2017/084743.
International Search Authority for PCT/CN2017/084743.

*Primary Examiner* — Olumide Ajibade Akonai

(57) ABSTRACT

A movable system includes a movable platform that includes a motorized drive to cause the movable platform to move in position, and a compartment located in an interior part of the movable platform; and an LIDAR system mounted to the movable platform including a probe fiber laser module located on the movable platform and producing pulsed probe laser light and scan the pulsed probe laser light out for optically sensing presence of one or more objects in the surrounding area based on detection of reflected probe laser light from the one or more objects. The probe fiber laser module includes a base laser module located inside the enclosure of the compartment and remote laser modules distributed at the platform instrument holding portions to scan the pulsed probe laser light out for optically sensing presence of one or more objects in the surrounding area.

35 Claims, 14 Drawing Sheets

(51) Int. Cl.
  *H01S 3/067* (2006.01)
  *G01S 17/931* (2020.01)
  *G01S 17/87* (2020.01)
  *G01S 13/931* (2020.01)

(52) U.S. Cl.
  CPC .... *H01S 3/06725* (2013.01); *H01S 3/094007* (2013.01); *H01S 3/094042* (2013.01); *B60W 2420/52* (2013.01); *G01S 17/87* (2013.01); *G01S 2013/9323* (2020.01); *G01S 2013/93271* (2020.01); *G01S 2013/93274* (2020.01)

(58) Field of Classification Search
  CPC ... G01S 2013/93271; G01S 213/93274; G01S 2013/93276; G01S 7/4806; G01S 7/4818; G01S 17/42; G01S 17/87; G01S 7/4817; H01S 3/094042; H01S 3/06725; H01S 3/094007
  See application file for complete search history.

(56) References Cited

U.S. PATENT DOCUMENTS

| | | | |
|---|---|---|---|
| 10,598,770 B2* | 3/2020 | Singer | G01S 7/4818 |
| 2003/0154010 A1 | 8/2003 | Rao et al. | |
| 2005/0179581 A1 | 8/2005 | Matsuura | |
| 2012/0154785 A1* | 6/2012 | Gilliland | G01S 17/931 |
| | | | 356/5.01 |
| 2013/0242284 A1 | 9/2013 | Zeng | |
| 2013/0265563 A1* | 10/2013 | Vogt | G01S 7/495 |
| | | | 356/4.01 |
| 2015/0192677 A1* | 7/2015 | Yu | G01S 17/87 |
| | | | 356/5.01 |
| 2017/0153319 A1* | 6/2017 | Villeneuve | H01S 3/08086 |
| 2017/0155225 A1* | 6/2017 | Villeneuve | G01S 17/06 |
| 2018/0188371 A1* | 7/2018 | Bao | G01S 17/87 |

* cited by examiner

VEHICLE-MOUNTED LIGHT DETECTION AND RANGING (LIDAR) SYSTEM

TECHNICAL FIELD

The technology disclosed in this patent document relates to light detection and ranging (LIDAR) systems, devices and techniques for operating movable platforms or motorized vehicles based on sensing surrounding objects based on LIDAR.

BACKGROUND

As shown in FIG. 1, object sensing based on a light detection and ranging (LIDAR) system can be used in various applications including assisting movable platforms 101 or motorized vehicles to detect surrounding objects to avoid collisions. For example, LIDAR can be used as part of the object sensing systems of a self-driving automobiles or in driver assistance systems of automobiles driven by persons.

SUMMARY

The disclosed technology can be implemented to provide a movable platform that includes a motorized drive to drive the movable platform to move in position, and a compartment located in an interior part of the movable platform and structured to provide an enclosure that is separated and protected from surroundings; and a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area.

The above and other aspects of the disclosed technology are described in greater detail in the drawings, the description and the claims.

DETAILED DESCRIPTION

Figure 1A:
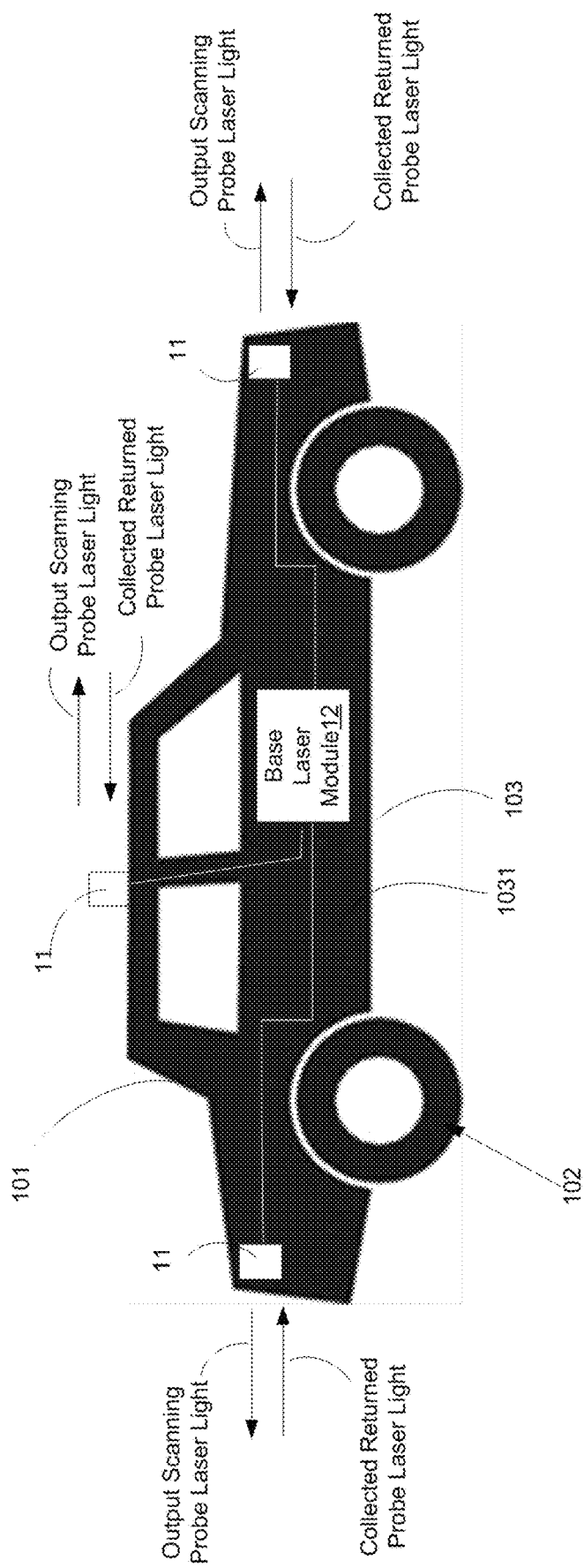
FIGS. 1A and 1B illustrate an automobile having a driver assistance system or an autonomous driving system that includes a vehicle-mounted LIDAR system by using fiber laser sources.

The technology disclosed in this patent document includes an LIDAR system that includes a probe laser module located on a movable platform 101 and structured to produce pulsed probe laser light and scan the pulsed probe laser light out to a surrounding area for optically sensing presence of one or more objects in the surrounding area and useful information of such a present object (e.g., location, dimension, motion, etc.) based on detection of reflected probe laser light from the one or more objects. The probe laser module can be structured to include different modules located at different locations on the movable platform 101 so that the resources of the probe laser module of the LIDAR system can be partitioned at different locations on the movable platform 101 to provide suitable operating environments for maintaining and operating the partitioned resources and improve the overall operational performance of the LIDAR system.

Based on the disclosed technology, the probe laser module of the LIDAR system may be partitioned into a base laser module 12 located inside an enclosure 1031 of the compartment 103 of the movable platform 101 and remote laser modules that are distributed at certain locations of the movable platform to scan the pulsed probe laser light out to the surrounding area for optically sensing the surrounding area for objects that may be interfere with the motion of the movable platform to avoid unintended collisions between such an object and the movable platform. Specifically, in some implementations, the movable platform can include a motorized drive 102 to cause the movable platform to move in position and a compartment located in an interior part of the movable platform and structured to provide an enclosure that is separated and protected from surroundings for housing the base laser module 12 that needs a more stabilized environment while the remote laser modules 11 can be located away from the interior part for the compartment at locations that are better situated to transmit probed light to the surroundings of the movable platform for LIDAR sensing and to receive returned light of the transmitted probe light from the surroundings.

The movable platform 101 can include a motorized drive system 102 that causes the movable platform 101 to move in position. Examples include motorized water vessels such as a motor boat and automobiles in various configurations such as a sedan, a van, a truck or an SUV. An automobile suitable for implementing the disclosed vehicle-mounted LIDAR system 141 can include, for example, a gasoline or diesel engine as part of the motorized drive, an electric motor as part of the motorized drive, a fuel cell powered motor as part of the motorized drive, or a natural gas powered motor as part of the motorized drive system. In some implementations, the movable platform can be an automobile having a hybrid drive system with two different types of motors as part of the motorized drive system.

FIG. 1A shows an example of an automobile with a driver assistance system 131 or autonomous driving system 132 that includes an LIDAR system as part of its overall sensing system to use scanning probe light to optically sense its surroundings. The illustrated LIDAR system includes a base laser module 12 located inside the automobile that includes sensitive components of the LIDAR system and is shielded from exposure to the elements outside environment of the automobile to produce probe laser light that is used for the LIDAR sensing operation. Different remote laser modules 11 are optically coupled to the base laser module 12 to receive the pulsed probe laser light generated by the base laser module 12 and are distributed at certain locations of the movable platform to scan the pulsed probe laser light out to the surrounding area as different probe beams for optically sensing different segments or directions in the surrounding area. Each remote laser module also serves as an optical receiver for receiving optical reflection of its output scanned probe light for detecting presence of any object in the light path of its output scanned probe light. Therefore, each remote laser module is a remote LIDAR transceiver. As illustrated in FIG. 1A, three different LIDAR remote transceivers are shown: a front LIDAR remote transceiver located in the front of the automobile to perform LIDAR sensing in the front direction of the automobile; a rear LIDAR remote transceiver located at the rear part of the automobile to perform LIDAR sensing in the rear direction of the automobile; and a rooftop LIDAR remote transceiver located on the rooftop of the automobile to perform LIDAR sensing in other directions that may not be covered by the front and rear LIDAR remote transceivers.

In some implementations of a driver assistance system 131 or autonomous driving system 132, the LIDAR system shown in FIG. 1A usually constitutes part of the overall automobile sensing system that further includes other sensors. Such other sensors can provide additional sensing capabilities to supplement to or provide alternatives to LIDAR sensing because the LIDAR system may fail to provide adequate sensing due to either the environment conditions (e.g., heavy rain, snow or thick fog) or malfunction of the LIDAR system.

Figure 1B:
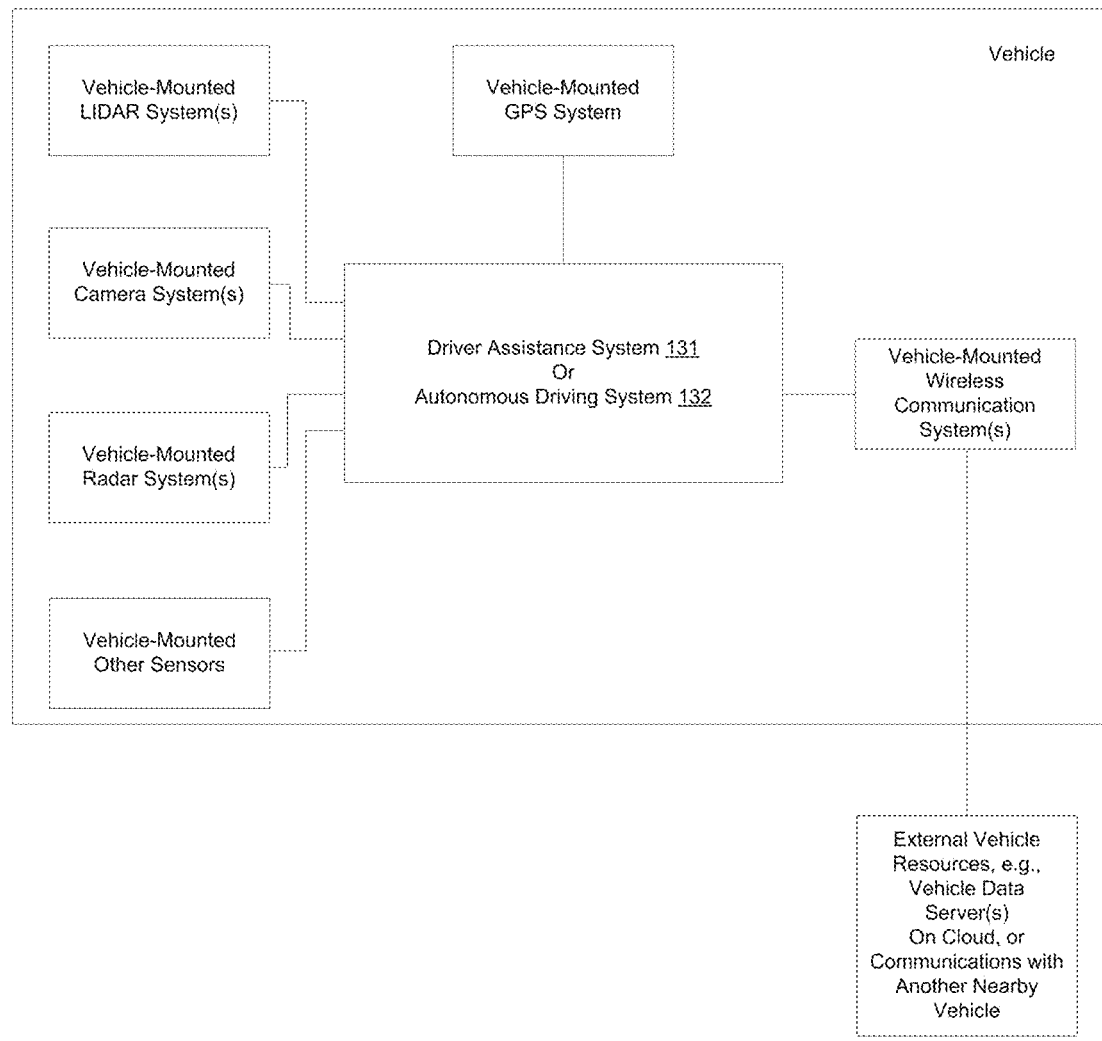

FIG. 1B shows examples of other sensors that may be mounted on the automobile as part of the overall sensing system and other additional sensors. The automobile may also include wireless communication capability for wirelessly communicating with other resources to obtain information for the driver assistance operations or the autonomous driving operations. For example, the automobile may wirelessly communicate with another nearby automobile in the surrounding area to obtain vehicle-to-vehicle data, or with a computer server on the cloud. The driver assistance system 131 or the autonomous driving system 132 in the automobile receives the data and information from the LIDAR, other sensors and resources and perform complex algorithms to generate information for driver assistance operations or the autonomous driving operations.

Figure 2A:
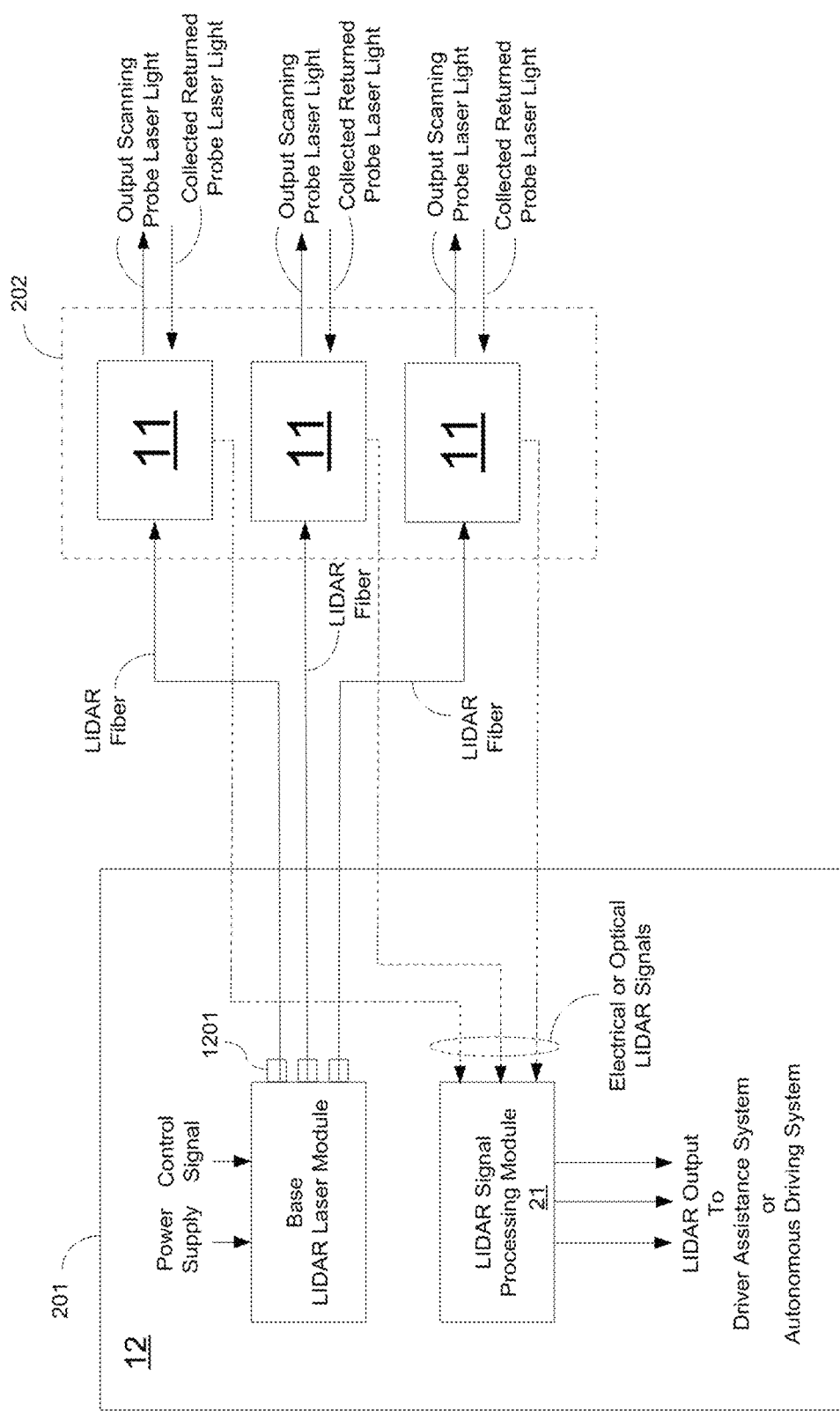
FIGS. 2A, 2B and 2C show examples of placing disclosed base laser module and remote laser modules of a vehicle-mounted LIDAR system in a vehicle.

FIG. 2A further illustrates an example for partitioning various resources in the vehicle-mounted LIDAR system 141 based on various considerations according to the disclosed technology. The base laser module 12 contains electronics that receives electrical power from a power supply to electrically energize one or more seed diode lasers to produce the probe laser light that is modulated based on a control signal for the LIDAR operations. The produced probe laser light is split into different probe laser beams at different output ports of the base laser module 12 for distribution to the remote laser modules 11. LIDAR fiber links are used to optically couple the remote laser modules 11 to the base laser module 12 and to deliver the probe laser pulses from the base laser module 12 to the remote laser modules 11 at desired locations on the vehicle such as the example shown in FIG. 1A. The remote laser modules 11 also receive optical reflection of the output probe light from the surroundings as LIDAR signals that are processed by an LIDAR signal processing module 21 to produce LIDAR output signals for the driver assistance system 131 or autonomous driving system 132.

Figure 2B:
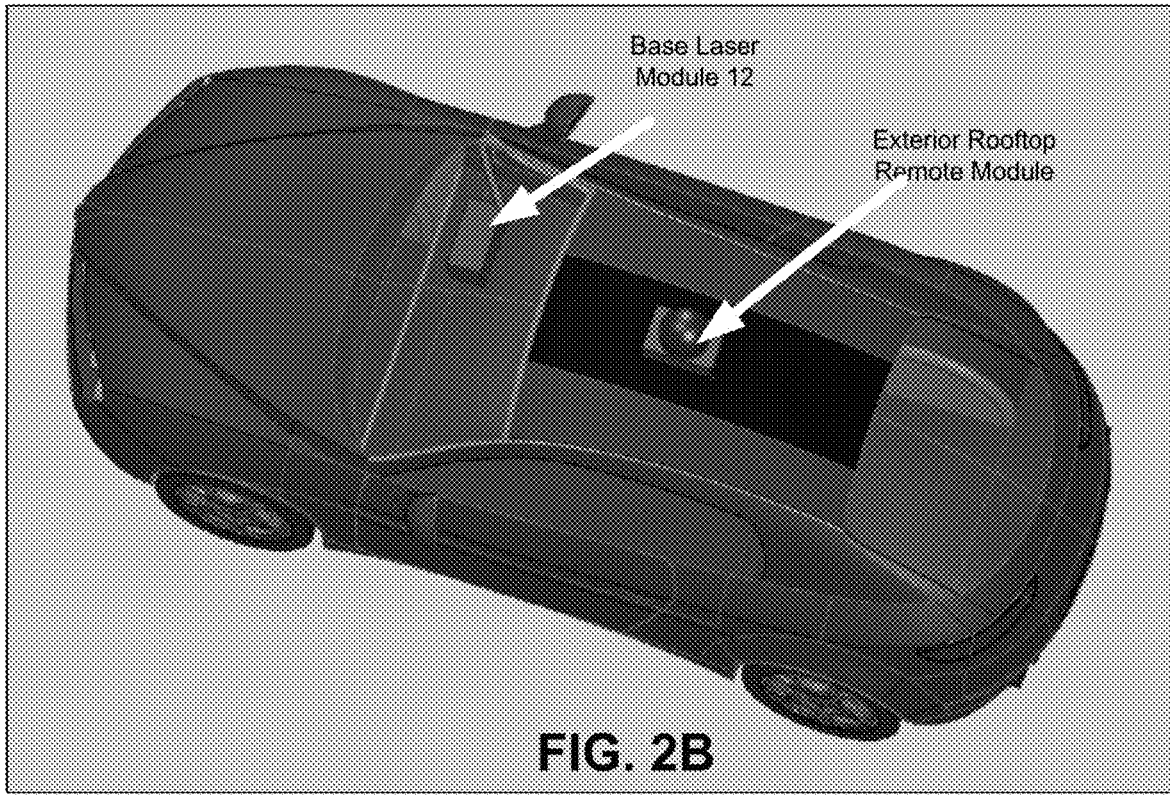
Figure 2C:
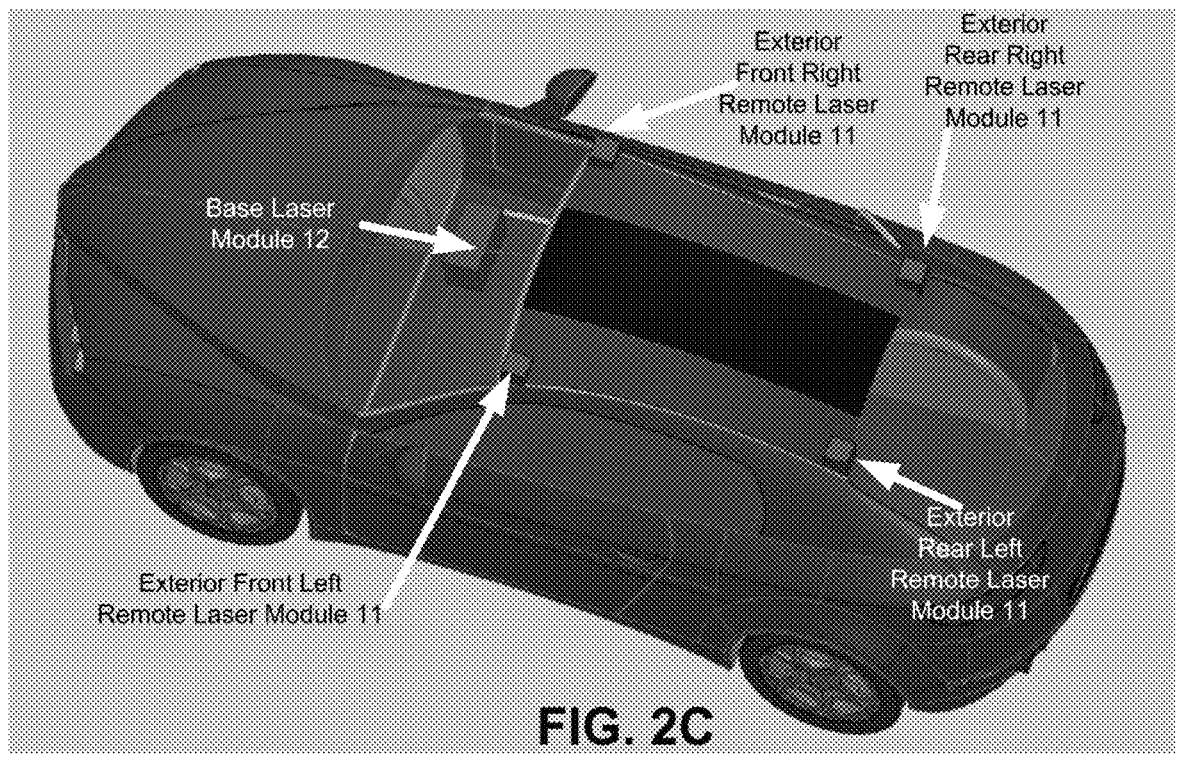

FIGS. 2B and 2C show two specific examples for placing the base laser module 12 and remote laser modules 11 based on FIG. 2A. In both examples, the base laser module 12 is placed in the driver-passenger compartment so that it is well protected from the exterior environment conditions while each remote laser module is placed at a selected location on the exterior of the vehicle to scan the probe light to a particular region for LIDAR sensing.

One of the key requirements in such an LIDAR system is the relatively high optical power of laser pulses in the probe laser light for providing effective LIDAR sensing under various driving conditions. For example, in some implementations, the average optical power of the output probe laser light beam from each remote laser module may be in a range from about 100 milliwatts to 1000 milliwatts. Diode lasers used in optical fiber communications can be used in such LIRDAR systems to produce the probe laser light due to their availability in volume, established reliability and durability, and reasonably pricing. The high output optical power requirement for such an LIDAR system can be achieved by using a seed laser diode to produce the seed probe laser light (e.g., at 1550 nm) and subsequent optical amplification to amplify the optical power of the seed probe laser light to the desired high optical power level. The optical amplification can be implemented in either or both of the base laser module 12 and a remote laser module. However, a high power laser pulse, when propagating in a fiber link, will invariably experience fiber dispersion and nonlinear optical effects caused in the fiber link and such an optical pulse may be undesirably distorted by the fiber dispersion and the nonlinear optical effects. As such, the optical amplification should carefully designed in the base and remote laser modules 11 to mitigate the undesired pulse distortion by the nonlinear optical effects in fiber and, when necessary, optical dispersion compensation may be implemented in such an LIDAR system to mitigate the fiber-induced optical pulse distortion in the probe laser light pulses caused by the fiber nonlinearities. In this regard, the optical pulse distortion caused by the fiber nonlinearities depends on the strength of the electric field of the optical pulses and can become significant as the pulse peak power increases. In addition to the pulse peak power, the optical pulse distortion is also dependent on the fiber dispersion property in the fiber where different spectral components travel at different speeds to cause different delays in time in a particular fiber segment to be stretched out or compressed in the pulse width depending whether that fiber segment exhibits positive or negative chromatic dispersion. Therefore, in designing a fiber laser system to reduce the undesired pulse distortion, the fiber can be designed or selected with appropriate dispersion to counter-act the pulse distortion caused by the fiber non-linear optical effects, e.g., by designing the normal and abnormal dispersion properties and spatial distribution in the fiber laser. Based on this inter-play between the optical nonlinearities and fiber dispersion with respect to the optical pulse distortion and pulse width, it is possible to minimize the pulse distortion by choosing appropriate fiber dispersion profile for a given pulse peak power and a pulse width. As part of the fiber laser design for an LIDAR disclosed in this patent document, different fiber laser design strategies are disclosed to produce desired high-power output laser pulses for probe light in LIDAR sensing. Accordingly, in some fiber laser designs for LIDAR sensing, the optical amplification is spatially distributed to maintain a low pulse peak power throughout the fiber laser system and significantly boost the pulse peak power just before the laser pulses exit the fiber portion of the fiber laser to minimize the pulse distortion while managing the dispersion-induced pulse distortion by properly designing the spatial fiber dispersion property profile in the fiber system. In other fiber laser designs for LIDAR sensing, the optical amplification is concentrated at a given segment of the fiber laser system, e.g., at or near the seed laser 31 in the beginning section of the fiber laser system while deploying one or more dispersion compensation fiber segments in the later stage of the fiber laser system to reduce the overall optical pulse distortion in the output laser pulses.

Automobiles are designed to operate in harsh and diversified conditions and thus the electronic and optical devices or components in such a vehicle-mounted LIDAR system 141 should be designed to provide reliable LIDAR sensing operation in such conditions, such as a wide range of weather conditions including high and low surrounding temperatures, severe vibrations and shocks. As illustrated in FIGS. 1A, 2A, 2B and 2C, the base laser module 12 of the LIDAR system may be located at a selected interior enclosure 201 such as the driver-passenger compartment to be isolated from the vehicle surroundings and thus reduce the exposure to the extreme surrounding temperatures and can contain electronic devices and the seed laser diodes while the remote laser modules 11, which may be necessarily located at exterior locations 202 of the vehicle, can be designed to contain components or devices that are less sensitive to extreme temperature changes.

Figure 3:
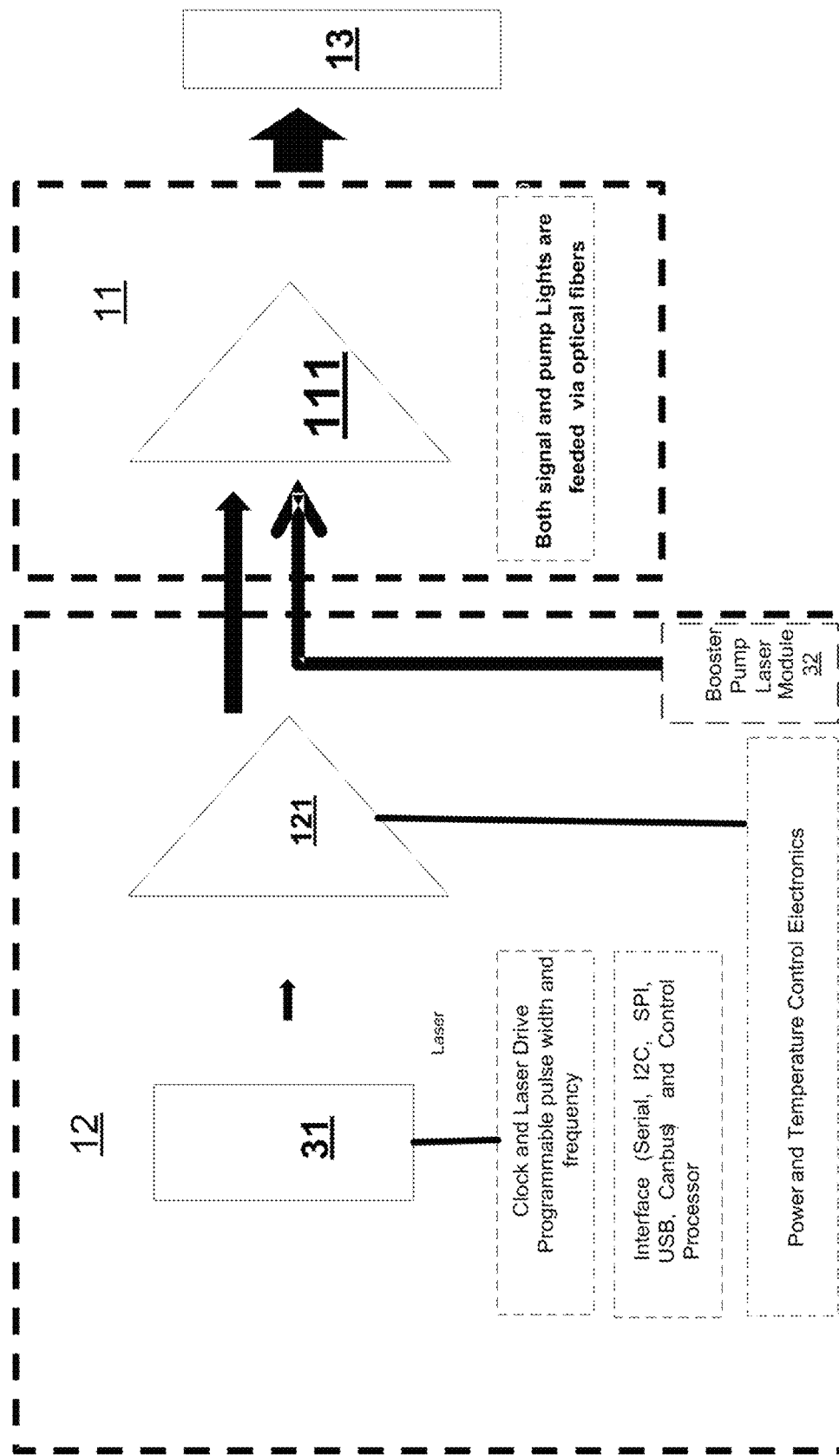
FIG. 3 depicts an example of a base laser module and remote laser modules of a vehicle-mounted LIDAR system that have remote optical booster amplifiers in remote laser modules to produce high power output probe laser pulses while minimizing pulse degradation by fiber dispersion and fiber nonlinearities in fiber linking the base laser module.

FIG. 3 shows one example for selective partition of components or devices of such an LIDAR system in the base laser module 12 and the remote laser modules 11. In this example, a seed laser diode for producing the seed probe laser light pulses and the seed laser driver electronics are placed in the base laser module 12 located in an interior of the vehicle, such as a location within the driver-passenger compartment of the vehicle. The base laser module 12 in this example further includes electronic interface components or devices for operating the seed laser diode, an pre-optical amplifier module 102 with an optical gain medium (e.g., a doped fiber gain section 94) for optically amplifying the seed laser light, one or more pump laser diodes to produce desired pump light at a pump laser wavelength (e.g., 980 nm) shorter than the seed probe laser wavelength (e.g., 1550 nm) to optically pump the optical gain medium and associated pump laser electronics. This pre-optical amplifier module 102 is an pre-optical amplifier and is carefully designed to maintain the amplified seed probe laser pulses at a sufficiently high level for delivery of such laser pulses to the remote laser modules 11 via the LIDAR fiber links but at a sufficiently low pulse peak power level to avoid significant nonlinear optical effects that cause undesired pulse distortion. To achieve the desired high optical pulse power at the output of each remote laser module, a remote optical booster amplifier 111 is included in each remote laser module 11 to amplify the received seed probe laser pulses which will be scanned by the remote laser module 11 in the air towards a target sensing area outside the vehicle. This design of a remote optical booster amplifier 111 in the remote laser module 11 is based on the consideration that the laser remote module is at the output end of the LIDAR system and thus high peak power optical probe light pulses produced at the laser remote module will no longer be subject to additional fiber dispersion or fiber nonlinear optical effects while managing the dispersion-induced pulse distortion by properly designing the spatial fiber dispersion property profile in the fiber laser system. Under this design, the fiber used in the fiber laser system may be a relatively low dispersion fiber for reducing the dispersion-induced laser pulse distortion and, since the laser pulse peak power is kept low before the remote laser modules 11 so that the laser pulse distortion caused by the fiber nonlinearities can also be maintained at an acceptable low level.

In addition to placing the optical booster amplifier in the remote laser module 11, the example in FIG. 3 further selectively places a booster pump laser module and its electronic driver in the base laser module 12 so that they are protected from extreme vehicle exterior conditions. Under this design, the pump light for the remote optical booster amplifier 111 is generated in the base laser module 12 and is delivered via fiber to the remote laser module 11 so that the remote optical booster laser in the remote laser module 11 contains an optical combiner for coupling the pump light into the optical gain medium and contains no electronics or electronic power supply. Accordingly, in this specific design example, all seed and pump lasers and their electronic drivers are located in the base laser module 12 and are protected from the extreme exterior vehicle conditions. This design can be advantageous in terms of providing a more stable laser operating condition for the seed and pump lasers 32 to improve the stability and reliability in producing the high power probe laser light pulses for the LIDAR system while reducing the optical distortion in the output high power probe laser light pulses.

Figure 4:
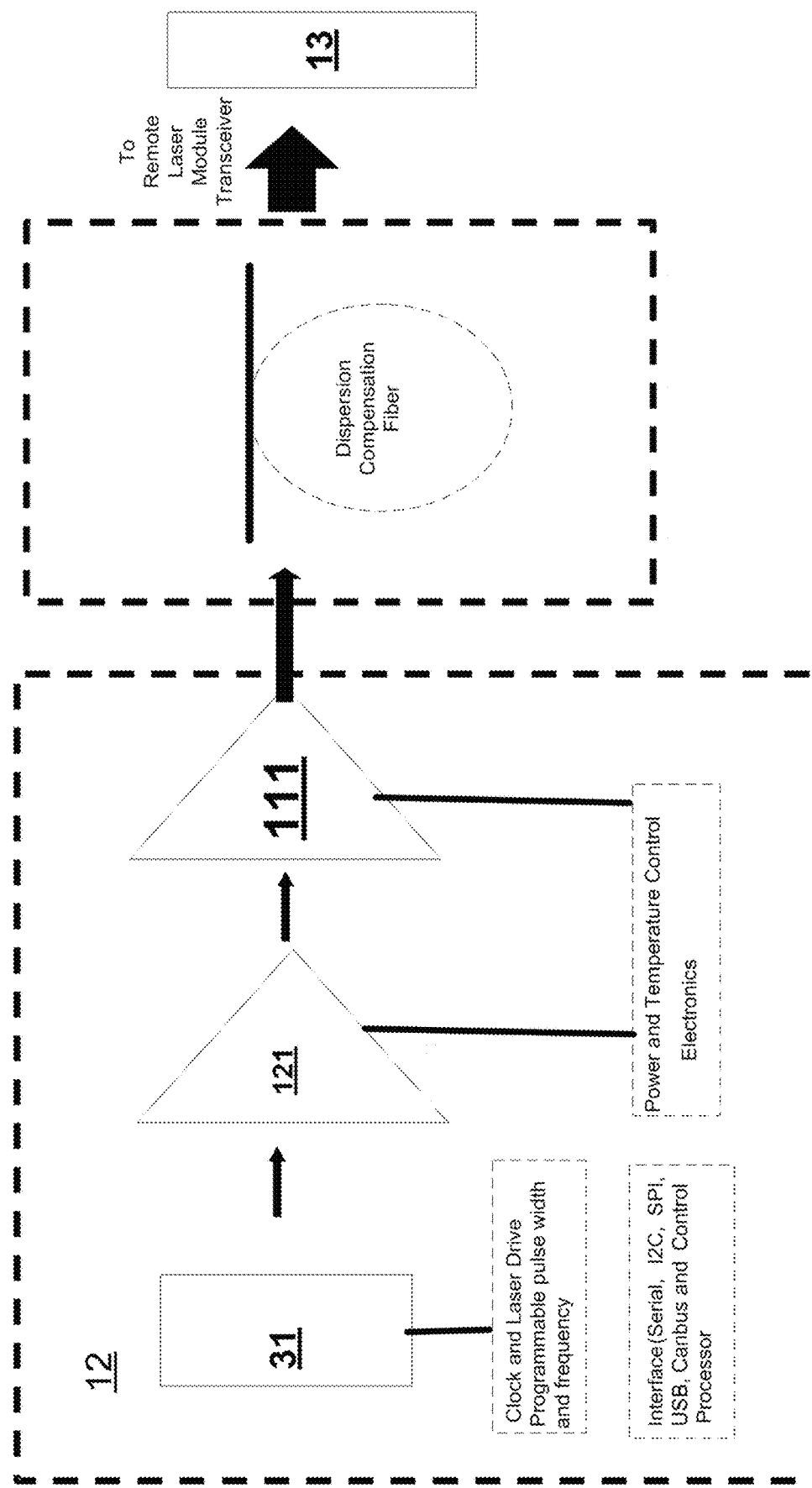
FIG. 4 depicts an example of a base laser module and remote laser modules of a vehicle-mounted LIDAR system that include a seed laser and downstream optical booster amplifiers in the base laser module to maximize sharing the laser resources.

In the example in FIG. 3, each remote laser module 11 contains its own booster amplifier gain medium and the pump-seed light combiner and two fiber links are needed to guide the separately produced seed probe laser light beam and the booster pump laser beam from the base laser module 12 to the remote laser module 11. In a different design in FIG. 4, the base laser module 12 is structured to include not only seed lasers 31 and pump lasers 32 and their electronics drivers but also the optical gain medium for the optical booster amplifier that produces a sufficient optical gain to generate the high optical power for the output probe laser light pulses to be sent out at the remote laser modules 11 while the laser remote modules contain no optical amplification gain media. This design in FIG. 4 centralizes all laser light generation and amplification in the base laser module 12 to reduce the cost for optical amplification. In the LIDAR fiber links between the base laser module 12 and the remote laser modules 11, a dispersion compensated fiber segment is provided to adequately compensate for the laser pulse distortion caused by fiber nonlinearities. Different from the design example in FIG. 3 which amplifies the probe laser light pulses to the final desired high peak power level at each remote laser module 11 to reduce optical distortion caused by fiber nonlinearities, the high peak power probe laser light pulses in the design in FIG. 4 are first generated in the base laser module 12 and are then distributed via fiber to the remote laser modules 11. Therefore, in FIG. 4, due to the fiber nonlinearities in the LIDAR fiber links between the base laser module 12 and the remote laser modules 11, the optical power level output by the base laser module 12 is limited.

Therefore, the two different designs in FIGS. 3 and 4 are based on different tradeoff considerations in the LIDAR sensing operations. The design in FIG. 3 can be used to deliver higher output probe laser pulse power for improved signal to noise LIDAR sensing performance while the design in FIG. 4 can be used to reduce the overall cost of the LIDAR system. Both designs in FIGS. 3 and 4 use a single seed laser module to produce the seed laser light that is shared by different remote laser modules 11. This reduces the cost associated with the seed laser 31 in an LIDAR system. In both designs, each remote laser module 11 includes a beam scanner 13 that scans the output probe laser light for sensing in a particular region surrounding the vehicle designated for that remote laser module 11 (e.g., the front or rear end of the vehicle).

The following sections describe specific implementations examples based on the designs in FIGS. 3 and 4.

Figure 5A:
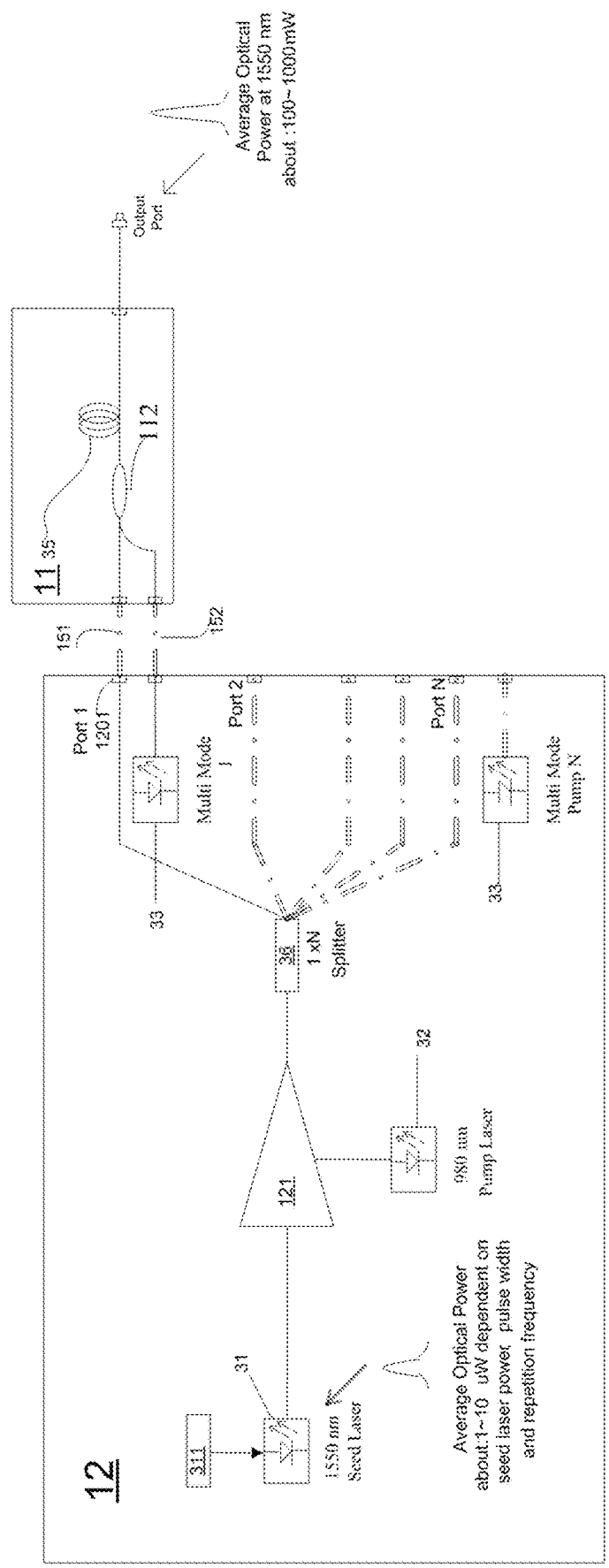
FIGS. 5A, 5B, 5C, 6, 7, and 8 show implementation examples for the base laser module and remote laser modules in LIDAR systems in FIGS. 3 and 4.

FIG. 5A shows an example of a fiber laser system of an LIDAR system implementing the design in FIG. 3. In FIG. 5A, the fiber laser system provides optical booster amplification in the remote laser modules 11 while placing seed lasers 31 and pump lasers 32 and associated laser driver electronics in the base laser module 12. Specifically, the base laser module 12 includes a seed probe laser module which may include one seed laser diode to produce pulsed seed probe laser light at a probe laser wavelength (e.g., 1550 nm), and different booster pump laser modules 33 marked as "multi mode pump lasers 33" to produce booster pump laser light at a booster pump laser wavelength shorter than the probe laser wavelength (e.g., 980 nm). A base laser module driver circuitry 311 is included in the base laser module 12 and can include a seed laser 31 diver to supply electric power to and to operate the seed probe laser module for producing the pulsed seed probe laser light and different booster pump drivers to supply electric power to the booster pump laser modules for producing the booster pump laser light. The base laser module 12 includes base laser output ports 1201 that carry different base laser outputs, respectively, and each base laser output includes a pair of a base seed probe laser output at the probe laser wavelength from the pulsed seed probe laser light by the seed probe laser module and a booster pump laser output at the booster pump laser wavelength originated from a corresponding booster pump laser module.

Between the base laser module 12 and the remote laser modules 11 in FIG. 5A, probe fiber links 151 are coupled to the base laser output ports 1201 to respectively receive the base laser outputs at the probe laser wavelength so that each probe fiber link 151 is coupled to carry a base laser output from a corresponding base laser output port 1201 of the base laser module 12. Also, pump fiber links 152 are coupled to the base laser output ports 1201 to receive the booster pump laser outputs at the booster pump wavelength, respectively, so that each pump fiber link 152 is coupled to carry a booster pump laser output from a corresponding base laser output port 1201 of the base laser module 12.

In FIG. 5A, the remote laser modules 11 are physically separated from the base laser module 12 and are located at different remote laser module 11 locations from one another on the vehicle as shown in examples in FIGS. 1A, 2A, 2B and 2C. Each remote laser module 11 is coupled to one probe fiber link 151 and one pump fiber link 152 to receive a pair of a base seed laser output and a booster pump laser output from a corresponding base laser output port of the base laser module 12. The different remote laser modules 11 are respectively coupled to different base laser output ports 1201 of the base laser module 12. Each remote laser module 11 includes a remote booster optical amplifier 111 that is coupled to receive, and is optically energized by, a received booster pump laser output to amplify a received base probe laser output. Since the pump laser 32 is located in the base laser module 12, each remote laser module 11 does not have any electronics associated with the pump laser 32 and the optical amplification and thus can produce an output probe laser beam of amplified probe laser pulses without electric power.

As illustrated in FIG. 5A, the remote booster optical amplifier 111 in each remote laser module 11 includes a doped double cladding fiber gain section 35 to guide both a received booster pump laser output and a received base seed probe laser output from a corresponding base laser output port 1201 of the base laser module 12 and to convert energy of the received booster pump laser output at the booster pump laser wavelength into laser energy at the probe laser wavelength to produce an output probe laser beam of amplified probe laser pulses at the booster pump laser wavelength. In addition, each remote laser module 11 includes a fiber coupler 112 that couples the received booster pump laser output and the received base seed probe laser output into the doped double cladding fiber gain section 35.

FIG. 5A further shows an example of the seed laser 31 which can be a laser diode operating at 1550 nm with an average output optical power in the range of 1 to 10 microwatts in some implementations. An optical pre-amplifier can be included in the base laser module 12 by using a pre-amplifier pump laser (e.g., at 980 nm) to amplify the seed probe laser light pules from the seed laser 31 to a moderately higher power level. An optical splitter 36 can be included in the base laser module 12 to split the output of the optical pre-amplifier 121 into multiple seed probe laser beams that are guided (e.g., by fibers) to the base laser output ports 1201 as the base seed probe laser outputs that are paired with corresponding booster pump laser outputs from the booster pump laser modules in the base laser module 12. The peak optical power of each output laser pulse at the remote laser module 11 can be at a significantly high level, e.g., at kilo watt level, based on the optical amplification at the remote laser modules 11 since such a high power laser pulse is directly sent out for LIDAR sensing in the air and is no longer subject to fiber nonlinearities or dispersion.

Figure 5B:
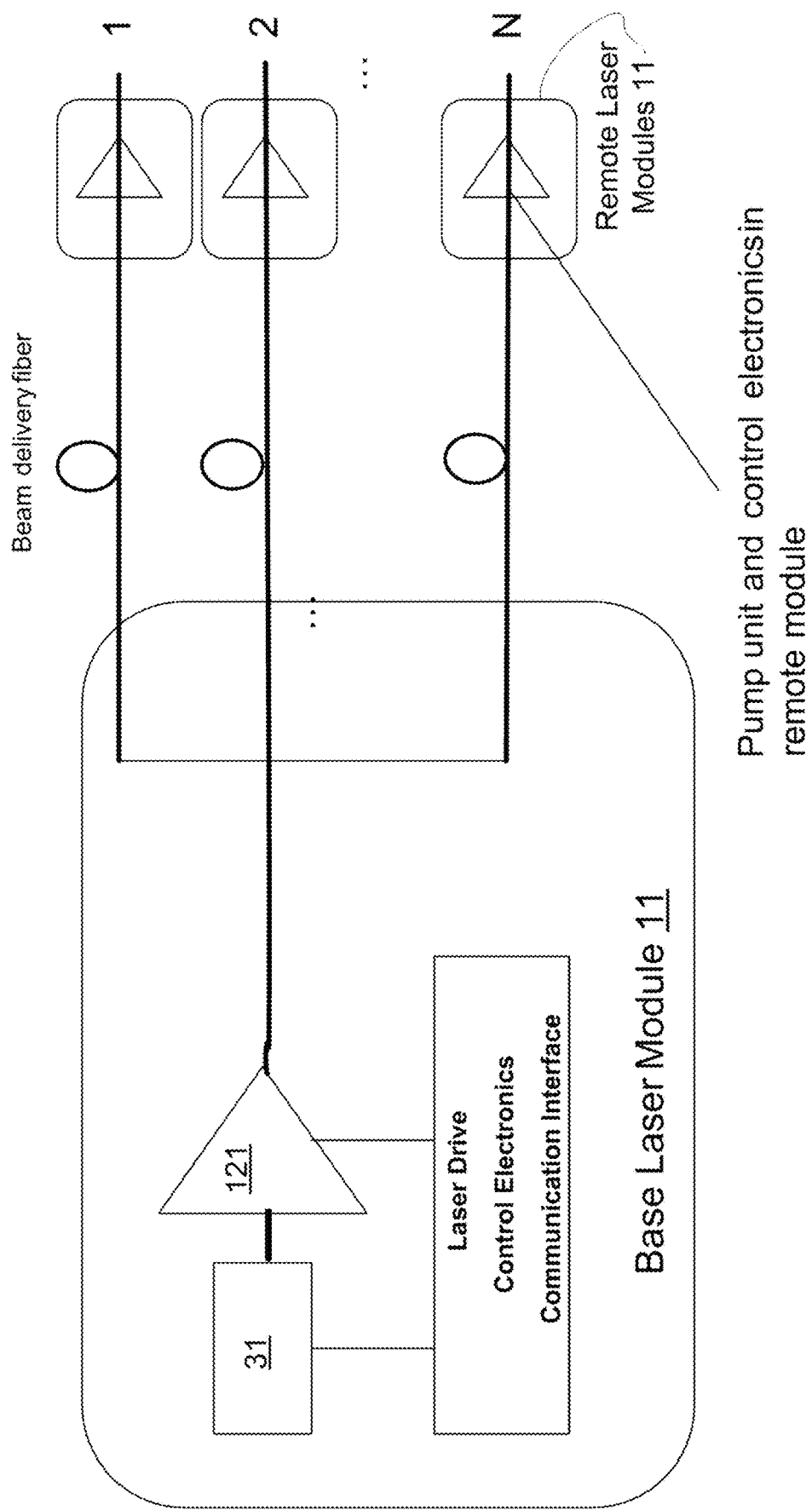

The implementation in FIG. 5A places all electrically powered electronics for the laser generation and optical amplification in the base laser module 12. Alternatively, the electrically powered electronics for the pump lasers 32 may also be placed in remote laser modules 11 in some implementations. This design eliminates the need for separate fiber links for the probe laser light at the probe laser wavelength (e.g., 1550 nm) and the pump laser light at a shorter pump laser wavelength (e.g., 980 nm) in the design in FIG. 5A. FIG. 5B shows an example of such an alternative LIDAR laser design. The optical pre-amplifier 121 and its driver electronics in FIG. 5B remain as part of the base laser module 12.

Figure 5C:
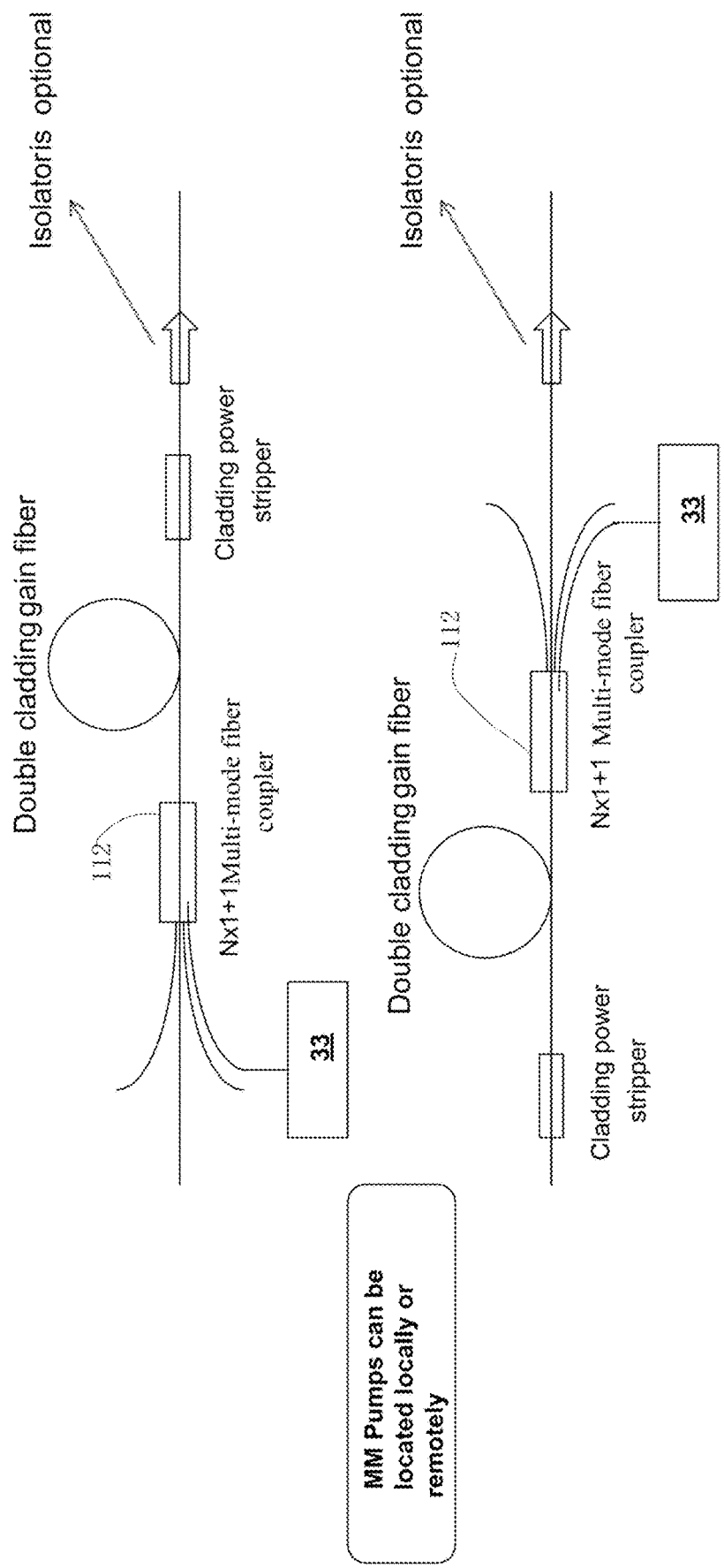

In both optical pre-amplifier 121 and the optical booster amplifier in FIGS. 5A and 5B and in other designs in this patent document, the optical pump 91 can be coupled into an optical gain medium such as a doped fiber gain section 94 in two different optical configurations as shown in FIG. 5C. The example shown in the upper illustration in FIG. 5C uses a multi-mode fiber coupler 112 to combine the seed probe laser light and the multi-mode pump laser light into the fiber gain segment (e.g., a double cladding gain fiber segment) in the same optical propagation direction. Another example shown in the lower illustration in FIG. 5C uses a multi-mode fiber coupler 112 to direct the multi-mode pump laser light into the fiber gain segment (e.g., a double cladding gain fiber segment) in an opposite optical propagation direction to that of the seed probe laser light, providing high pump-to-laser efficiency and a better optical separation between the amplified probe laser light and the pump laser light. Multiple pump lasers can be implemented in the FIG. 5C to increase the total pump power level for the amplification operation.

Figure 6:
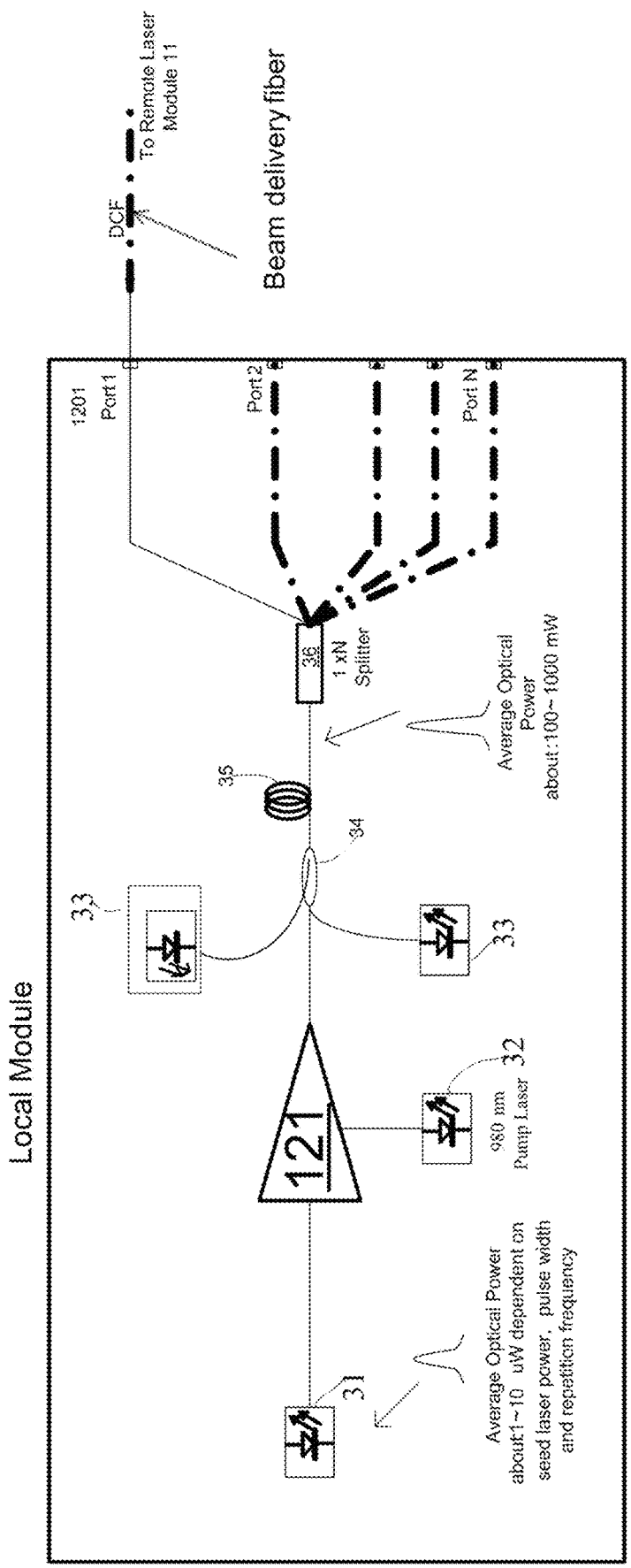

FIG. 6 illustrates an implementation example of the design in FIG. 4. In this example, the seed laser 31, the pump laser 32 for the optical pre-amplifier 121, the optical booster pump lasers and their driver electronics are all housed inside the base laser module 12. Specifically, a multi-mode pump combiner 34 is placed downstream from the optical pre-amplifier 121 to combine multiple booster pump laser beams into the fiber gain section of the optical booster amplifier based on one of the two pump coupling designs in FIG. 5C. Multiple multi-mode pump sources can be implemented in this design. As illustrated, the multi-mode pump combiner 34 combines the booster pump laser beams and the seed probe laser light output by the optical pre-amplifier 121 to co-propagate in the fiber gain section. In the fiber links for delivering multiple amplified probe laser light beams from different base output ports to the different remote laser modules 11, dispersion compensation fiber segments are provided to mitigate fiber dispersion and pulse distortion. This sharing of the common seed laser, the optical amplification and pump lasers and their driver electronics in the base laser module 12 between different remote laser modules 11 with remote laser scanners provide significant cost saving with respect to the LIDAR system.

Figure 7:
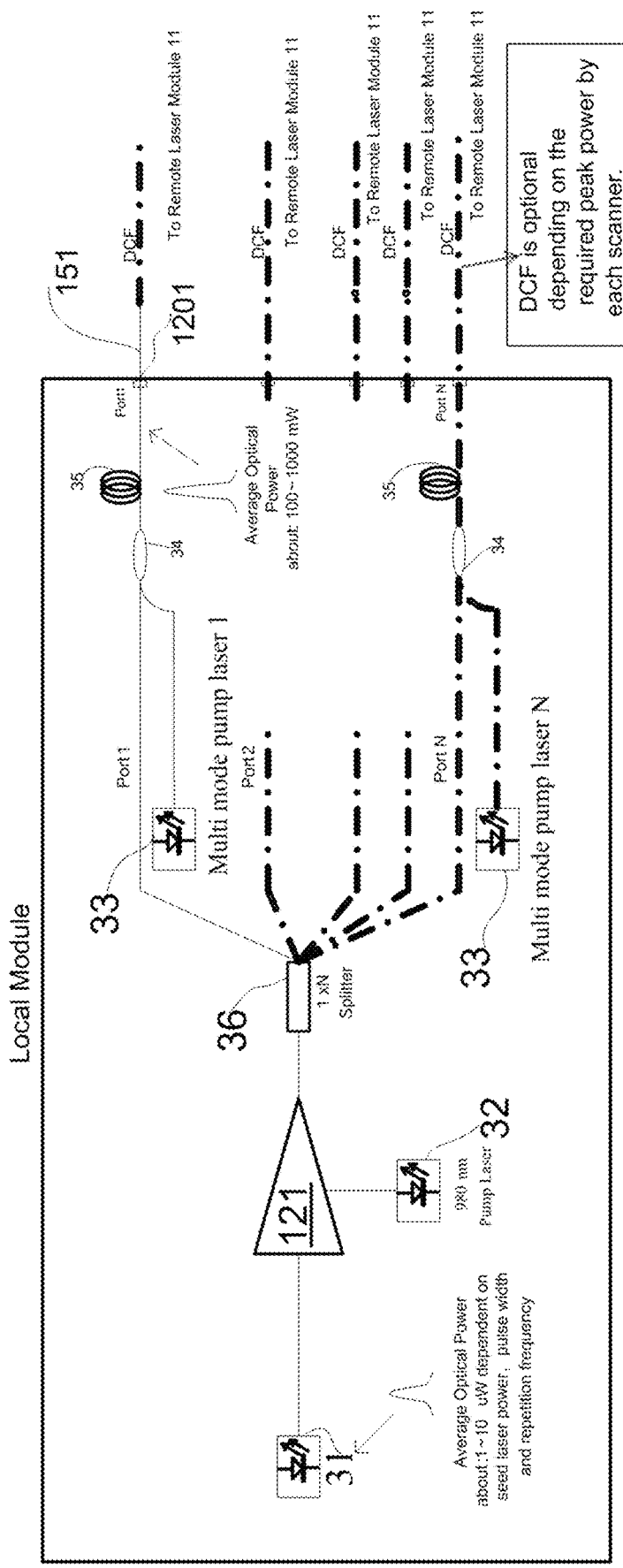

FIG. 7 shows another implementation for the design in FIG. 4 where different optical pump lasers and different optical booster pumps are placed in the base laser module 12 to serve different remote laser modules 11, respectively. Under this design, the probe laser light from the optical pre-amplifier 121 is first split into multiple probe laser beams, and separate pump lasers 32 and optical booster amplifiers are coupled to amplify the multiple probe laser beams to produce the outputs at the different base output ports. Specifically, the base laser module 12 includes a seed probe laser 31 to produce pulsed seed probe laser light at a probe laser wavelength, an optical splitter 36 that splits the pulsed seed probe laser light from the seed probe laser 31 into different seed probe laser beams, different booster pump lasers 32 to produce booster pump laser beams at a booster pump laser wavelength, and different optical combiners coupled to receive the different seed probe laser beams, respectively, and further coupled to receive the different booster pump laser beams, respectively. Each optical combiner is operable to combine a received booster pump laser beam and a received seed probe laser beam into a combined beam. The base laser module includes booster optical amplifiers coupled to the different optical combiners, respectively, such that each booster optical amplifier receives is optically energized by the booster pump laser light to amplify the pulsed seed probe laser light to produce an output probe laser beam of amplified probe laser pulses. Such amplified probe laser beams are output out of the base laser module at their respective base laser output ports 1201. Probe fiber links 151 are coupled to the base laser output ports 1201 to respectively receive the different probe laser outputs at the probe laser wavelength so that each probe fiber link 151 is coupled to carry a probe laser output to a corresponding remote laser module 11 which includes an optical scanner that scans a received probe laser output as a scanning output probe laser beam for LIDAR sensing. The sharing of laser resources in FIG. 7 is less than that in FIG. 6 and provides more flexibility in controlling the power levels of different probe laser outputs at different base laser output ports 1201 for their different power level needs.

As an example, referring to FIG. 1A, the front remote laser module 11 that performs LIDAR sensing in front of the vehicle tends to require a longer sensing range at a higher laser power level than the rear remote laser module 11 since the vehicle tends to move at a faster speed going forward than in the reverse direction. As such, the pump laser and the optical booster amplifier for the front remote laser module 11 can be configured to produce a higher optical amplification than a pump laser and an optical booster amplifier for a rear remote laser module 11. The separation of pump lasers 32 and optical booster amplifiers in FIG. 7 can facilitate this.

Figure 8:
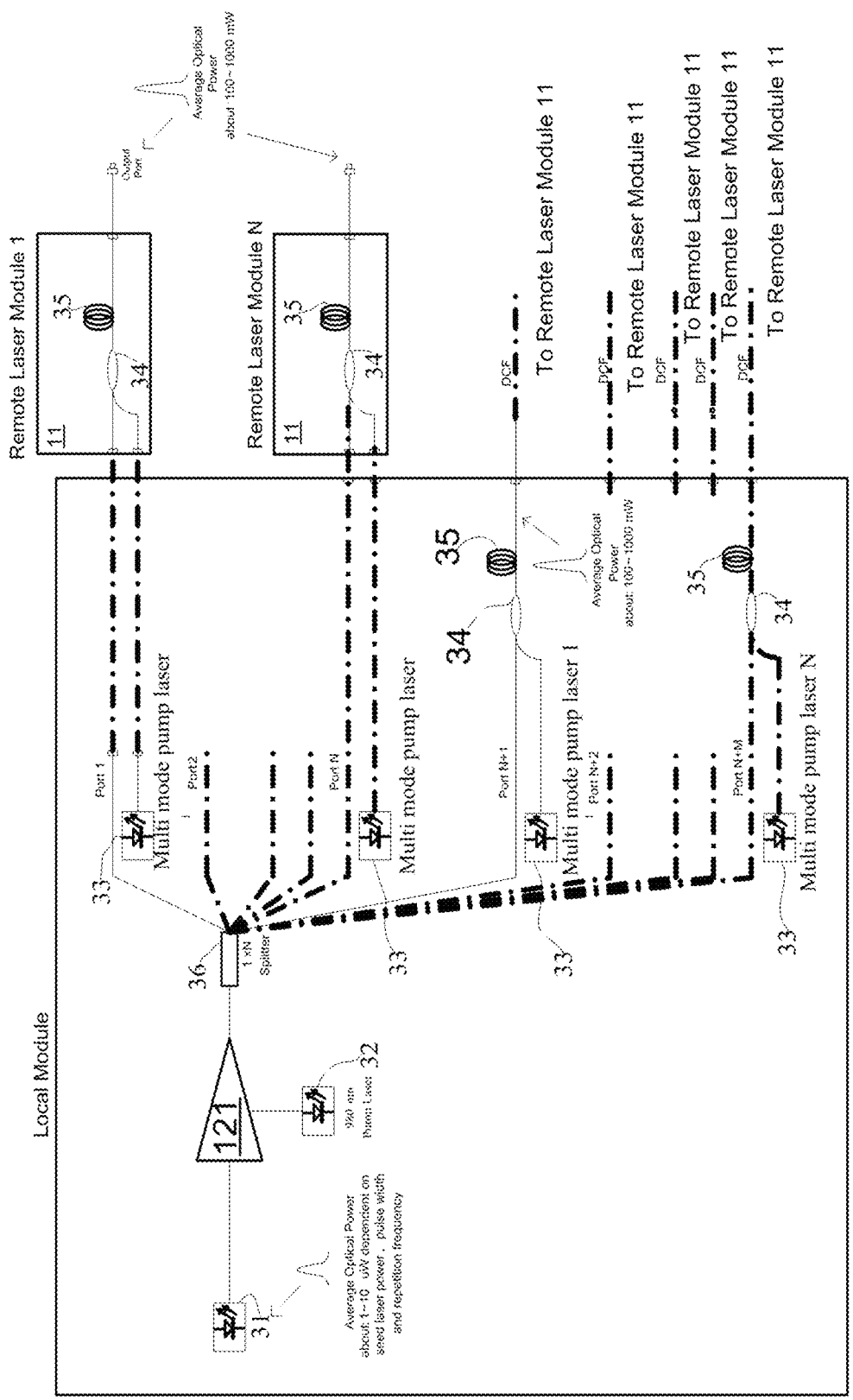

FIG. 8 shows another implementation that combines the designs in FIGS. 3 and 4 to provide cost saving by selectively sharing certain laser resources among certain remote laser modules 11 based on the design in FIG. 4 and to also allow certain remote laser modules 11 to include remote optical booster amplifiers 111 for producing higher power probe light beams based on the design in FIG. 3. The design in FIG. 8 provides different tradeoff considerations for various applications. For example, an LIDAR system based on FIG. 8 can use the remote laser modules 11 that include their own remote optical booster amplifiers 111 for producing higher power probe light beams based on the design in FIG. 3 to serve as front remote laser modules 11 placed in the front of the vehicle for longer range LIDAR sensing while placing other remote laser modules 11 based on the sharing design in FIG. 4 facing the rear directions of the vehicle for shorter range LIDAR sensing.

Figure 9A:
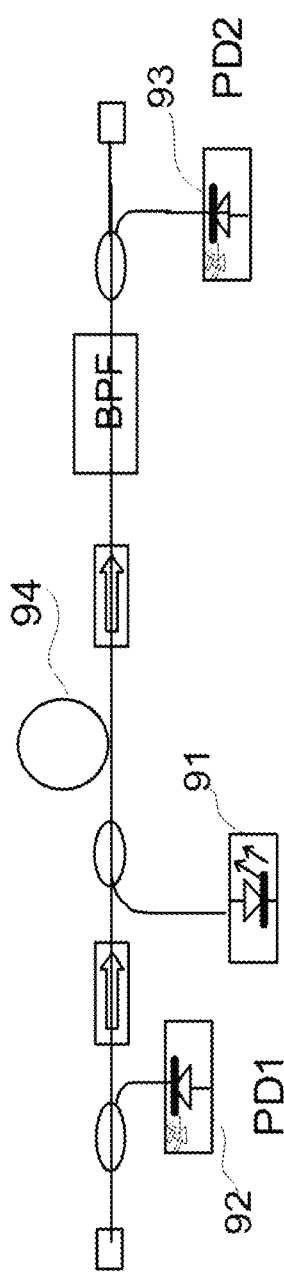
FIGS. 9A, 9B and 9C show different examples of implementing an optical pre-amplifier in a base laser module for a disclosed LIDAR system.
Figure 9B:
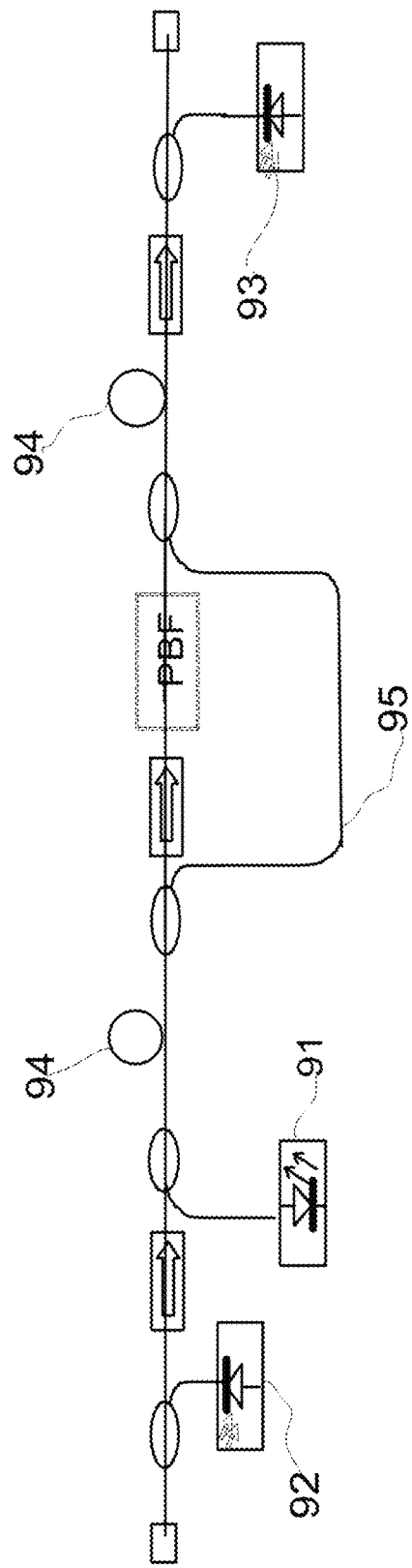
Figure 9C:
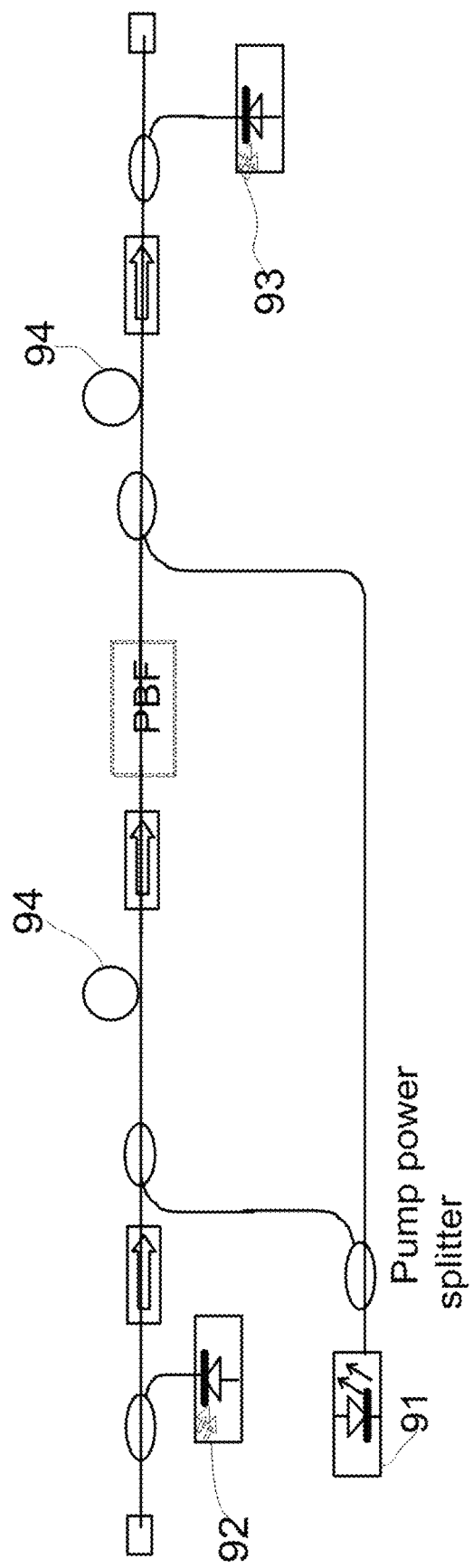

In the above examples for the laser systems in vehicle-mounted LIDAR systems 141, the optical pre-amplifier 121 can be implemented in different configurations based on the needs of specific systems or applications. FIGS. 9A, 9B and 9C show three examples for having different optical amplification stages for the optical pre-amplifier 121. FIG. 9A shows a single-stage optical pre-amplifier 121 where a photodetector monitor PD1 92 is provided to monitor the received probe laser light power from the seed laser prior to amplification by the optical pre-amplifier 121 and a photodetector monitor PD2 93 is provided to monitor the output probe laser light power by the optical pre-amplifier. FIG. 9B shows a two-stage optical pre-amplifier that includes two fiber gain sections in two amplification stages connected in series where an optical pump power bypass stage 95 is coupled between the two stages to (1) filter the amplified probe laser light produced by the first stage and (2) redirect the unused pump laser 32 via a bypass route to optically pump the fiber gain medium in the second stage so that the two stages share a common pump laser source. FIG. 9C shows another example of a two-stage optical pre-amplifier that includes two fiber gain sections in two amplification stages connected in series to share a common pump laser source. In both FIGS. 9B and 9C, a photodetector monitor PD1 92 is provided to monitor the received probe laser light power from the seed laser 31 prior to amplification and a photodetector monitor PD2 93 is provided to monitor the output probe laser light power after the two-stage amplification.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A movable system, comprising:
    a movable platform that includes a motorized drive to cause the movable platform to move in position, and a compartment located in an interior part of the movable platform and structured to provide an enclosure that is separated and protected from surroundings; and
    a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area,
    wherein the base laser module includes a seed probe laser module to produce pulsed seed probe laser light at a probe laser wavelength, a booster pump laser module to produce booster pump laser light at a booster pump laser wavelength, base laser module driver circuitry coupled to supply electric power to the seed probe laser module for producing the pulsed seed probe laser light and the booster pump laser module for producing the booster pump laser light, and a plurality of base laser output ports that carry a plurality of base laser outputs, respectively,
    wherein each base laser output includes a pair of base seed probe laser outputs at the probe laser wavelength from the pulsed seed probe laser light by the seed probe laser module and a booster pump laser output at the booster pump laser wavelength originated from the booster pump laser module,
    wherein the LIDAR system includes
    a plurality of probe fiber links coupled to the base laser output ports to respectively receive the base laser outputs at the probe laser wavelength so that each probe fiber link is coupled to carry a base laser output from a corresponding base laser output port of the base laser module, and
    a plurality of pump fiber links coupled to the base laser output ports to receive the booster pump laser outputs at the booster pump wavelength, respectively, so that each pump fiber link is coupled to carry a booster pump laser output from a corresponding base laser output port of the base laser module, and
    wherein the remote laser modules are physically separated from the base laser module and are located at different remote laser module locations from one another, each remote laser module coupled to one probe fiber link and one pump fiber link to receive a pair of a base seed laser output and a booster pump laser output from a corresponding base laser output port of the base laser module, different remote laser modules respectively coupled to different base laser output ports of the base laser module, wherein each remote laser module includes a remote booster optical amplifier that is coupled to receive, and is optically energized by, a received booster pump laser output to amplify a received base probe laser output, without electrical power, to produce an output probe laser beam of amplified probe laser pulses for sensing the surrounding area.

2. The system according to claim 1, wherein: the remote booster optical amplifier in each remote laser module includes a doped double cladding fiber gain section to guide both a received booster pump laser output and a received base seed probe laser output from a corresponding base laser output port of the base laser module and to convert energy of the received booster pump laser output at the booster pump laser wavelength into laser energy at the probe laser wavelength to produce an output probe laser beam of amplified probe laser pulses at the booster pump laser wavelength; and
    each remote laser module includes a fiber coupler that couples the received booster pump laser output and the received base seed probe laser output into the doped double cladding fiber gain section.

3. The system according to claim 2, wherein: the doped double cladding fiber gain section is doped with rare earth ions.

4. The system according to claim 2, wherein: the doped double cladding fiber gain section is doped with Er.

5. The system according to claim 1, wherein: the seed probe laser module is configured to produce the pulsed seed probe laser light at a probe laser wavelength around 1550 nm, and
    the booster pump laser module is configured to produce the booster pump laser light at a booster pump laser wavelength around 980 nm.

6. The system according to claim 1, wherein: the base laser module includes a pre-amplifier coupled to receive and amplify the pulsed seed probe laser light at the probe laser wavelength to produce each of the base seed probe laser outputs at the base laser output ports.

7. The system according to claim 6, wherein the base laser module includes: an optical splitter downstream from the pre-amplifier to receive and split output light of the pre-amplifier into the base seed probe laser outputs at the base laser output ports.

8. The system according to claim 7, wherein the optical splitter is coupled to further receive the booster pump laser light from the booster pump laser module and split the received booster pump laser light into different booster pump laser outputs at the base laser output ports, respectively.

9. The system according to claim 8, wherein the booster pump laser module is structured to produce the booster pump laser light as a multimode light beam.

10. The system according to claim 8, wherein the booster pump laser module includes different booster pump lasers that respectively produce the different booster pump laser outputs at the base laser output ports, respectively.

11. The system according to claim 1, wherein each remote laser module further includes:
an optical scanner that is located to receive the output probe laser beam of amplified probe laser pulses from the remote booster optical amplifier and to scan the received output probe laser beam of amplified probe laser pulses as a scanning output probe laser beam.

12. The system according to claim 11, wherein each remote laser module further includes:
an optical receiver that receives reflected light caused by an object located in a path of the scanning output probe laser beam.

13. The system according to claim 1, wherein the movable platform is an automobile.

14. The system according to claim 13, wherein the automobile includes a gasoline or diesel engine as part of the motorized drive.

15. The system according to claim 13, wherein the automobile includes an electric motor as part of the motorized drive.

16. The system according to claim 13, wherein the automobile includes a fuel cell powered motor as part of the motorized drive.

17. The system according to claim 13, wherein the automobile includes a natural gas powered motor as part of the motorized drive.

18. The system according to claim 13, wherein the automobile includes a hybrid drive system with two different types of motors as part of the motorized drive.

19. The system according to claim 13, wherein the compartment is located at a location inside or adjacent to an automobile cabin.

20. The system according to claim 13, wherein one or more of the remote laser modules are mounted to direct and scan the pulsed probe laser light towards the front of the automobile while one or more of the remote laser modules are mounted to direct and scan the pulsed probe laser light towards other directions around the automobile.

21. The system according to claim 1, wherein the movable platform floats on water.

22. A movable system, comprising:
a movable platform that includes a motorized drive to cause the movable platform to move in position, and a compartment located in an interior part of the movable platform and structured to provide an enclosure that is separated and protected from surroundings; and
a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area,
wherein the base laser module that includes
a seed probe laser module to produce pulsed seed probe laser light at a probe laser wavelength,
a booster pump laser module to produce booster pump laser light at a booster pump laser wavelength,
a booster optical amplifier that is coupled to receive both the pulsed seed probe laser light and the booster pump laser light, and is optically energized by the booster pump laser light to amplify the pulsed seed probe laser light to produce an output probe laser beam of amplified probe laser pulses,
an optical splitter that splits the output probe laser beam of amplified probe laser pulses into different probe laser outputs; and
a plurality of base laser output ports that receive, respectively, different probe laser outputs from the optical splitter,
wherein the LIDAR system includes a plurality of probe fiber links coupled to the base laser output ports to respectively receive the different probe laser outputs at the probe laser wavelength so that each probe fiber link is coupled to carry a probe laser output, and
wherein the remote laser modules are physically separated from the base laser module and are located at different remote laser module locations from one another, each remote laser module coupled to one probe fiber link from a corresponding base laser output port of the base laser module, wherein each remote laser module includes an optical scanner that scans a received probe laser output as a scanning output probe laser beam.

23. The system according to claim 22, wherein the booster optical amplifier includes:
an optical coupler coupled to receive and combine the booster pump laser light from the booster pump laser module and the pulsed seed probe laser light from the seed probe laser module into one combined beam; and
a double cladding fiber amplifier coupled to receive the combined beam from the optical coupler to use the booster pump laser light to amplify the received pulsed seed probe laser light.

24. The system according to claim 23, wherein the booster pump laser module is configured to produce the booster pump laser light as a multimode pump beam to the optical fiber coupler.

25. The system according to claim 22, wherein the seed probe laser module includes:
a seed laser that produces initial pulsed seed probe laser light; and
a pre-amplifier coupled to receive initial pulsed seed probe laser light from the seed laser to amplify the received initial pulsed seed probe laser light into the pulsed seed probe laser light received by the booster optical amplifier.

26. The system according to claim 22, wherein each probe fiber link includes a dispersion compensation fiber (DCF) segment that suppresses pulse spreading.

27. A movable system, comprising:
a movable platform that includes a motorized drive to cause the movable platform to move in position, and a compartment located in an interior part of the movable platform and structured to provide an enclosure that is separated and protected from surroundings; and
a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area, wherein the base laser module includes a seed probe laser module to produce pulsed seed probe laser light at a probe laser wavelength, an optical splitter that splits the pulsed seed probe laser light from the seed probe laser module into different seed probe laser beams;

different booster pump lasers to produce booster pump laser beams at a booster pump laser wavelength, booster optical amplifiers coupled such that each booster optical amplifier receives a corresponding booster pump laser beam and is optically energized by the booster pump laser light to amplify the pulsed seed probe laser light to produce an output probe laser beam of amplified probe laser pulses, and a plurality of base laser output ports that receive, respectively, different probe laser outputs from the booster optical amplifiers, wherein the LIDAR system includes a plurality of probe fiber links coupled to the base laser output ports to respectively receive the different probe laser outputs at the probe laser wavelength so that each probe fiber link is coupled to carry a probe laser output, and wherein the remote laser modules are physically separated from the base laser module and are located at different remote laser module locations from one another, each remote laser module coupled to one probe fiber link from a corresponding base laser output port of the base laser module, wherein each remote laser module includes an optical scanner that scans a received probe laser output as a scanning output probe laser beam.

28. The system according to claim 27, wherein the booster pump laser module is configured to produce the booster pump laser light as a multimode pump beam.

29. The system according to claim 27, wherein the seed probe laser module includes:

a seed laser that produces initial pulsed seed probe laser light; and a pre-amplifier coupled to receive initial pulsed seed probe laser light from the seed laser to amplify the received initial pulsed seed probe laser light into the pulsed seed probe laser light received by the optical splitter.

30. The system according to claim 27, wherein each probe fiber link includes a dispersion compensation fiber (DCF) segment that suppresses pulse spreading.

31. A movable system, comprising:

a movable platform that includes a motorized drive to cause the movable platform to move in position, and a compartment located in an interior part of the movable platform and structured to provide an enclosure that is separated and protected from surroundings; and a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area, wherein the base laser module includes a seed probe laser module to produce pulsed seed probe laser light at a probe laser wavelength, an optical splitter that splits the pulsed seed probe laser light from the seed probe laser module into different seed probe laser beams;

first booster pump lasers to produce first booster pump laser beams at a booster pump laser wavelength;

second booster pump lasers to produce second booster pump laser beams at the booster pump laser wavelength;

base module optical combiners coupled to receive the different seed probe laser beams from a first portion of the seed probe laser beams output by the optical splitter, respectively, and further coupled to receive the first booster pump laser beams of the fist booster pump lasers, respectively, each base module optical combiner operable to combine a received first booster pump laser beam and a received seed probe laser beam into a combined beam;

base module booster optical amplifiers coupled to the base module optical combiners, respectively, such that each base module booster optical amplifier receives a combined beam from a corresponding base module optical combiner, is optically energized by the booster pump laser light to amplify the pulsed seed probe laser light to produce an output probe laser beam of amplified probe laser pulses;

first base laser output ports that receive, respectively, different output probe laser beams from the base module booster optical amplifiers; and second base laser output ports that receive, respectively, a second portion of the seed probe laser beams output by the optical splitter and the second booster pump laser beams from the second booster pump lasers, wherein the LIDAR system includes first probe fiber links coupled to the first base laser output ports to respectively receive the different probe laser outputs at the probe laser wavelength amplified by the base module booster optical amplifiers, second probe fiber link coupled to the second base laser output ports to respectively receive the different seed probe laser beams in the second portion of the seed probe laser beams that are not amplified by the base module booster pump amplifiers, and pump fiber links coupled to the second base laser output ports to receive the second booster pump laser beams, respectively, so that each pump fiber link is coupled to carry a second booster pump laser beam, wherein the LIDAR system includes first remote laser modules that are physically separated from the base laser module and coupled to the first probe fiber links, respectively, each remote laser module coupled to one first probe fiber link, wherein each first remote laser module includes an optical scanner that scans a received probe laser output as a first scanning output probe laser beam, and wherein the LIDAR system includes second remote laser modules that are physically separated from the base laser module and coupled to the second probe fiber links and the pump fiber links, each second remote laser module coupled to one second probe fiber link and one pump fiber link to receive a pair of a seed probe laser beam in the second portion of the seed probe laser beams that are not amplified by the base module booster pump amplifiers and a second booster pump laser output, wherein each second remote laser module includes (1) a remote booster optical amplifier that is coupled to receive, and is optically energized by, a received second booster pump laser output to amplify a received seed probe laser beam, without electrical power, to produce a second output probe laser beam of amplified probe laser pulses, and (2) an optical scanner that scans the second output probe laser beam from the remote booster optical amplifier as a second scanning output probe laser beam.

32. The system according to claim 31, wherein each first probe fiber link includes a dispersion compensation fiber (DCF) segment that suppresses pulse spreading.

33. A movable system, comprising:
- a movable platform that includes a motorized drive to cause the movable platform to move in position, and a compartment located in an interior part of the movable platform and structured to provide an enclosure that is separated and protected from surroundings; and
- a light detection and ranging (LIDAR) system mounted to the movable platform to include a probe fiber laser module located on the movable platform and structured to produce pulsed probe laser light and scan the pulsed probe laser light out to a surrounding area for optically sensing presence of one or more objects in the surrounding area based on detection of reflected probe laser light from the one or more objects, wherein the probe fiber laser module includes a base laser module located inside the enclosure of the compartment and remote laser modules that are distributed at the platform instrument holding portions to scan the pulsed probe laser light out to the surrounding area for optically sensing presence of one or more objects in the surrounding area,
- wherein the base laser module includes
- a seed probe laser module to produce pulsed seed probe laser light at a probe laser wavelength,
- base laser module driver circuitry coupled to supply electric power to the seed probe laser module for producing the pulsed seed probe laser light, and
- a plurality of base laser output ports that carry a plurality of base laser outputs, respectively, wherein each base laser output includes a base seed probe laser output at the probe laser wavelength from the pulsed seed probe laser light by the seed probe laser module;
- wherein the LIDAR system includes a plurality of probe fiber links coupled to the base laser output ports to respectively receive the base laser outputs at the probe laser wavelength so that each probe fiber link is coupled to carry a base laser output from a corresponding base laser output port of the base laser module, and
- wherein the remote laser modules are physically separated from the base laser module and are located at different remote laser module locations from one another, each remote laser module coupled to one probe fiber link to receive a base seed laser output from a corresponding base laser output port of the base laser module, different remote laser modules respectively coupled to different base laser output ports of the base laser module,
- wherein each remote laser module includes
- a booster pump laser module to produce booster pump laser light at a booster pump laser wavelength,
- a remote booster optical amplifier that is coupled to receive, and is optically energized by, the booster pump laser light to amplify a received base probe laser output to produce an output probe laser beam of amplified probe laser pulses,
- an optical scanner that scans the output probe laser beam of amplified probe laser pulses, and
- remote laser module driver circuitry coupled to supply electric power to the booster pump laser module and the optical scanner.

34. The system according to claim 33, wherein: the remote booster optical amplifier in each remote laser module includes a doped double cladding fiber gain section to convert energy of the received booster pump laser light at the booster pump laser wavelength into laser energy at the probe laser wavelength to produce an output probe laser beam of amplified probe laser pulses at the booster pump laser wavelength.

35. The system according to claim 33, wherein: each remote laser module includes a fiber coupler that couples the received booster pump laser light and the received base seed probe laser output into the doped double cladding fiber gain section.

* * * * *